(12) United States Patent
Toba et al.

(10) Patent No.: US 9,358,459 B2
(45) Date of Patent: Jun. 7, 2016

(54) INFORMATION PROCESSING DEVICE, DISPLAY DEVICE, AND INFORMATION PROCESSING SYSTEM

(75) Inventors: Kazuaki Toba, Kanagawa (JP); Tomoya Yamaura, Tokyo (JP)

(73) Assignee: Sony Corporation, Tokyo (JP)

( * ) Notice: Subject to any disclaimer, the term of this patent is extended or adjusted under 35 U.S.C. 154(b) by 628 days.

(21) Appl. No.: 12/998,189

(22) PCT Filed: Aug. 12, 2009

(86) PCT No.: PCT/JP2009/064243
§ 371 (c)(1),
(2), (4) Date: Mar. 25, 2011

(87) PCT Pub. No.: WO2010/044309
PCT Pub. Date: Apr. 22, 2010

(65) Prior Publication Data
US 2011/0179442 A1   Jul. 21, 2011

(30) Foreign Application Priority Data

Oct. 16, 2008   (JP) .............................. P2008-267895

(51) Int. Cl.
| | |
|---|---|
| *H04N 7/173* | (2011.01) |
| *G06F 3/00* | (2006.01) |
| *G06F 13/00* | (2006.01) |
| *H04N 5/445* | (2011.01) |
| *H04N 7/18* | (2006.01) |
| *A63F 13/40* | (2014.01) |

(Continued)

(52) U.S. Cl.
CPC .................. *A63F 13/10* (2013.01); *A63F 13/12* (2013.01); *H04N 21/43615* (2013.01); *H04N 21/44222* (2013.01); *H04N 21/4583* (2013.01); *H04N 21/4882* (2013.01); *A63F 2300/301* (2013.01); *A63F 2300/532* (2013.01)

(58) Field of Classification Search
CPC .................. H04N 21/43615; H04N 21/44222; H04N 21/4583; H04N 21/4882
USPC .................................... 725/24, 37, 38, 59, 78
See application file for complete search history.

(56) References Cited

U.S. PATENT DOCUMENTS

| | | | | |
|---|---|---|---|---|
| 2002/0071401 | A1* | 6/2002 | Nire ............................... | 370/328 |
| 2005/0060750 | A1* | 3/2005 | Oka et al. ........................ | 725/80 |
| 2005/0155052 | A1* | 7/2005 | Ostrowska et al. ............. | 725/25 |
| 2007/0171198 | A1* | 7/2007 | Yokozawa .................... | 345/156 |

(Continued)

FOREIGN PATENT DOCUMENTS

| | | |
|---|---|---|
| EP | 0949781 A1 | 10/1999 |
| JP | 2007-184745 A | 7/2007 |
| JP | 2007-194974 A | 8/2007 |

OTHER PUBLICATIONS

European Office Action issued on Nov. 15, 2012 in patent application No. 09820487.8.

*Primary Examiner* — Kyu Chae

(74) *Attorney, Agent, or Firm* — Chip Law Group

(57) ABSTRACT

Provided is an information processing device including a communication unit for transmitting content data to a plurality of display devices connected, a request check unit for causing other display devices to display a check screen for an arbitrary request upon reception of the request from one of the plurality of display devices, and determining whether to permit the request in accordance with a user operation in the other display devices which display the check screen, and a control unit for performing a response control for the request when the request check unit permits the request.

9 Claims, 12 Drawing Sheets

(51) Int. Cl.
*A63F 13/30* (2014.01)
*H04N 21/436* (2011.01)
*H04N 21/442* (2011.01)
*H04N 21/458* (2011.01)
*H04N 21/488* (2011.01)

(56) References Cited

U.S. PATENT DOCUMENTS

2008/0034391 A1 2/2008 Lehman et al.
2010/0010998 A1* 1/2010 Wagner ........................ 707/9

* cited by examiner

EXCLUSIVE REQUEST FROM DISPLAY DEVICE 10A

YES/CHANGE SOURCE DEVICE・・・OK BUTTON
YES/STOP VIEWING・・・POWER OFF BUTTON
NO・・・CANCEL BUTTON

TRANSITION TO EXCLUSIVE STATE OF
DISPLAY DEVICE 10A IS COMPLETED
DISCLOSE EXCLUSIVENESS TO OTHER DISPLAY DEVICES?

NO・・・CANCEL BUTTON

RELEASE REQUEST FROM DISPLAY DEVICE 10A

YES···OK BUTTON    /NO···CANCEL BUTTON

DISPLAY DEVICE 10C HAS EXCLUSIVENESS ON SOURCE DEVICE 20A

INFORMATION PROCESSING DEVICE, DISPLAY DEVICE, AND INFORMATION PROCESSING SYSTEM

CROSS-REFERENCES TO RELATED APPLICATIONS

The present application is a national phase entry under 35 U.S.C. §371 of International Application No. PCT/JP2009/064243 filed Aug. 12, 2009, published on Apr. 22, 2010 as WO 2010/044309 A1, which claims priority from Japanese Patent Application No. JP 2008-267895 filed in the Japanese Patent Office on Oct. 16, 2008.

TECHNICAL FIELD

The present invention relates to an information processing device, a display device, and an information processing system.

BACKGROUND ART

A reproduction device for transmitting the same content data to a plurality of output devices exists in the related art. For example, a reproduction device for reproducing content data and transmitting the reproduced content data to a plurality of output devices, thereby enabling the same content to be viewed at the plurality of output devices exists.

Patent Literature 1 describes a system in which a plurality of remote controllers controls the same device to be controlled through a network. Specifically, in the system described in Patent Literature 1, the device to be controlled operates by acquiring the controlling right or based on the control instruction from the remote controller.

CITATION LIST

Patent Literature

Patent Literature 1: JP 2007-184745 (A)

SUMMARY OF INVENTION

Technical Problem

Assume a system in which the reproduction process by the reproduction device can be controlled from the output device side as in the system described in Patent Literature 1 is proposed. In such system, however, the control instruction with respect to a reproduction device from a certain output device may not meet the intention of the user viewing the content at another output device since the content data reproduced by the reproduction device is output with a plurality of output devices.

In light of the foregoing, it is desirable to provide a novel and improved information processing device, display device, and information processing system capable of carrying out the control that meets the intentions of a plurality of users.

Solution to Problem

In order to solve the above issue, an aspect of the present invention provides an information processing device including: a communication unit for transmitting content data to a plurality of display devices connected; a request check unit for causing other display devices to display a check screen for an arbitrary request upon reception of the request from one of the plurality of display devices, and determining whether to permit the request in accordance with a user operation in the other display devices which display the check screen; and a control unit for performing a response control for the request when the request check unit permits the request.

The request check unit may not permit the request when a user operation rejecting the request is carried out in one of the other display devices.

The information processing device may further include a reproduction unit for reproducing content data transmitted from the communication unit, and the control unit may control reproduction content by the reproduction unit according to the request when the request check unit permits the request.

The control unit may release the connection between the communication unit and the other display devices when a specific request is transmitted from one of the display devices and the specific request is permitted by the request check unit.

When a connection request with respect to the information processing device is received from an arbitrary display device while the request check unit is permitting the specific request, the request check unit may cause the one display device to display a check screen for the connection request, and determine whether to permit the connection request in accordance with a user operation in the one display device.

The reproduction unit may stop the reproduction of the content data when the connection between all of the plurality of display devices and the communication unit is released.

The information processing device may further include an operation detection unit for detecting a user operation, and the control unit may perform the response control for the request indicated by the user operation detected by the operation detection unit without the request check unit causing the plurality of display devices to display the check screen.

Also, in order to solve the above issue, another aspect of the present invention provides a display device including: a receiving unit for receiving content data from an information processing device; a transmitting unit for transmitting an arbitrary request to the information processing device; a display unit for displaying a check screen for the request instructed from the information processing device based on the request from another display device to the information processing device; and an operation detection unit for detecting a user operation. Herein, the transmitting unit transmits content of the user operation detected by the operation detection unit in the check screen to the information processing device.

Also, in order to solve the above issue, another aspect of the present invention provides an information processing system including: a plurality of display devices; and an information processing device including: a transmitting unit for transmitting content data to the plurality of display devices; a request check unit for causing other display devices to display a check screen for an arbitrary request upon reception of the request from one of the plurality of display devices, and determining whether to permit the request in accordance with a user operation in the other display devices which display the check screen; and a control unit for performing a response control for the request when the request check unit permits the request.

Advantageous Effects of Invention

Therefore, according to the information processing device, the program, the information processing method, and the information processing system of the present invention, the control that meets the intentions of a plurality of users can be carried out.

DESCRIPTION OF EMBODIMENTS

Hereinafter, preferred embodiments of the present invention will be described in detail with reference to the appended drawings. Note that, in this specification and the drawings, elements that have substantially the same function and structure are denoted with the same reference signs, and repeated explanation is omitted.

The "Description of Embodiments" will be described according to the following order of items.

1. Overall configuration of information processing system according to the present embodiment
2. Hardware configuration of display device and source device
3. Function and operation of information processing system
 (At start of viewing of contents)
 (At time of reproduction control)
 (At time of transition to exclusive state and at time of release of exclusive state)
4. Conclusion and Supplement <1. Overall Configuration of Information Processing System According to the Present Embodiment>

First, the overall configuration of an information processing system 1 according to the present embodiment will be described.

Figure 1:
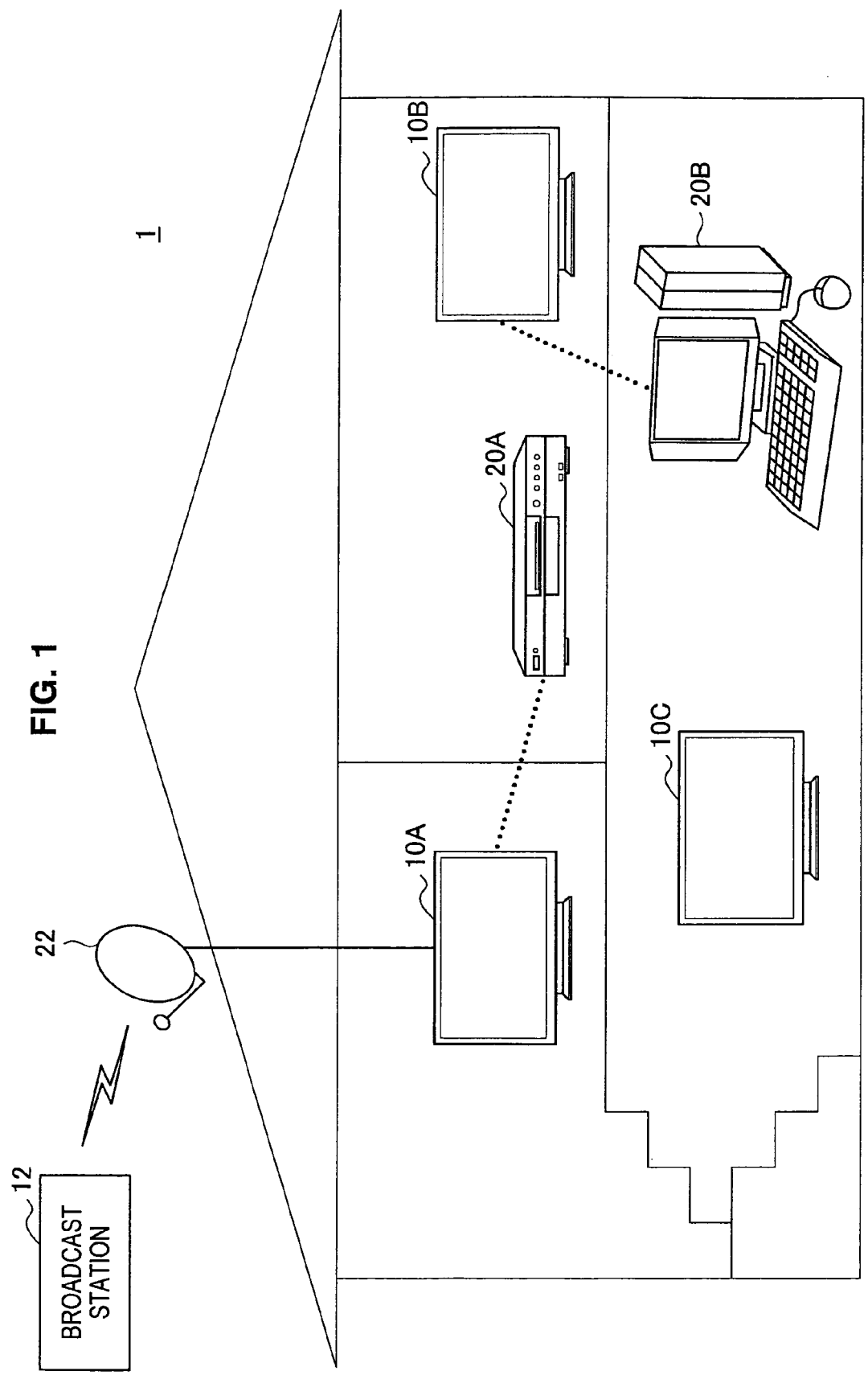
FIG. 1 is an explanatory diagram showing the overall configuration of an information processing system according to the present embodiment.

FIG. 1 is an explanatory diagram showing the overall configuration of the information processing system 1 according to the present embodiment. As shown in FIG. 1, the information processing system 1 according to the present embodiment includes a plurality of display devices 10A to 10C, a plurality of source devices 20A and 20B, an antenna 22, and a broadcast station 12.

In the specification, different alphabets are denoted after the same reference number to distinguish each of the plurality of configurations having substantially the same function. However, if each of the plurality of configurations having the same function does not need to be distinguished, only the same reference number is denoted. For example, if the display devices 10A and 10B do not need to be particularly distinguished, they are simply collectively referred to as the display device 10.

The broadcast station 12 transmits program content data of television broadcasting through airwave, dedicated communication network, and the like. The television broadcasting may be a television broadcasting of an arbitrary method such as BS (Broadcast Satellite) broadcasting, CS (Communication Satellite) broadcasting, digital terrestrial broadcasting, analog terrestrial broadcasting, and cable broadcasting. The broadcast station 12 can transmit information related to the program content data (e.g., EPG: Electronic Program Guide) along with the program content data. The program content data transmitted from the broadcast station 12 is received by the antenna 22 and provided to the display device 10 and the source device 20.

The display device 10 and the source device 20 can also acquire content data from a content providing server through a network. The content data includes arbitrary data such as music data including music, lectures, and radio programs, video data including movies, television programs, video programs, photographs, documents, pictures, and graphs, games, and software.

The network may include a public line network such as Internet, telephone line network and satellite communication network, various types of LAN (Local Area Network) and WAN (Wide Area Network) including Ethernet (registered trademark), and the like. The network may also include a dedicated line network such as IP-VPN (Internet Protocol-Virtual Private Network).

Furthermore, the display device 10 and the source device 20 can also acquire the content data from an attached storage medium. The storage medium may be a storage medium such as a non-volatile memory, a magnetic disc, an optical disc, and an MO (Magneto Optical) disc. The non-volatile memory includes an EEPROM (Electrically Erasable Programmable Read-Only Memory), and an EPROM (Erasable Programmable ROM). The magnetic disc includes a hard disc and a disc-shaped magnetic body disc. The optical disc includes a CD (Compact Disc), a DVD-R (Digital Versatile Disc Recordable), and a BD (Blu-Ray Disc (registered trademark)).

The source device 20 is connected with one or two or more display devices 10, and transmits content data to the connected display device 10. The source device 20 can acquire the content data through an arbitrary method described above, but description will be hereinafter made emphasizing the example of recording the content data acquired by the source device 20 in a built-in storage medium, and transmitting the content data recorded in the storage medium.

An example in which the source device 20 and the display device 10 are wirelessly connected is shown in FIG. 1, but the present invention is not limited to such example. For example, the source device 20 and the display device 10 may be connected with a fixed line of HDMI (High-Definition Multimedia Interface), component, and the like. If the source device 20 and the display device 10 are wirelessly connected, an arbitrary wireless communication method enabling bi-directional communication can be applied.

In FIG. 1, the source device 20 such as a home video processing device or a PC (Personal Computer) is shown as one example of the information processing device, but the information processing device is not limited to such example. For example, the information processing device may be a PDA (Personal Digital Assistants), a home game device, a home electronics, a portable video processing device, a portable game device, a tuner, an input selector connected with a plurality of reproduction devices, and the like.

The display device 10 displays contents and outputs audio based on the content data transmitted from the connected source device 20. The display device 10 may be a CRT (Cathode Ray Tube) display device, a liquid crystal display (LCD) device, or an OLED (Organic Light Emitting Diode) device. Furthermore, the display device 10 may be an arbitrary information processing device similar to the source device 20.

In the information processing system 1 according to the present embodiment, each display device 10A to 10C can connect with an arbitrary source device 20A or 20B. In FIG. 1, a state in which the display device 10A is connected to the source device 20A, and the display device 10B is connected to the source device 20B is shown by way of example.

When the source device 20 and the display device 10 are connected at one to one, the user can control the operation of the source device 20 by operating the display device 10. For example, the user of the display device 10A shown in FIG. 1 can switch the content data to be transmitted by the source device 20 by operating the display device 10A.

However, a case where a plurality of display devices 10 is connected to the same source device 20 is also assumed since the source device 20 according to the present embodiment has the function of transmitting the content data to a plurality of display devices 10. For example, a case where the display device 10C is connected to the source device 20A in addition to the display device 10A can be assumed. However, the control the user of the display device 10A performs on the source device 20A through the display device 10A is not necessarily the control that meets the intention of the user of the display device 10C.

The information processing system 1 according to the present embodiment has been contrived focusing on the above situation. According to the information processing system 1 of the present embodiment, the control that meets the intention of the user of each display device 10 can be carried out. The display device 10 and the source device 20 configuring such an information processing system 1 will be described in detail below.

<2. Hardware Configuration of Display Device and Source Device>

Figure 2:
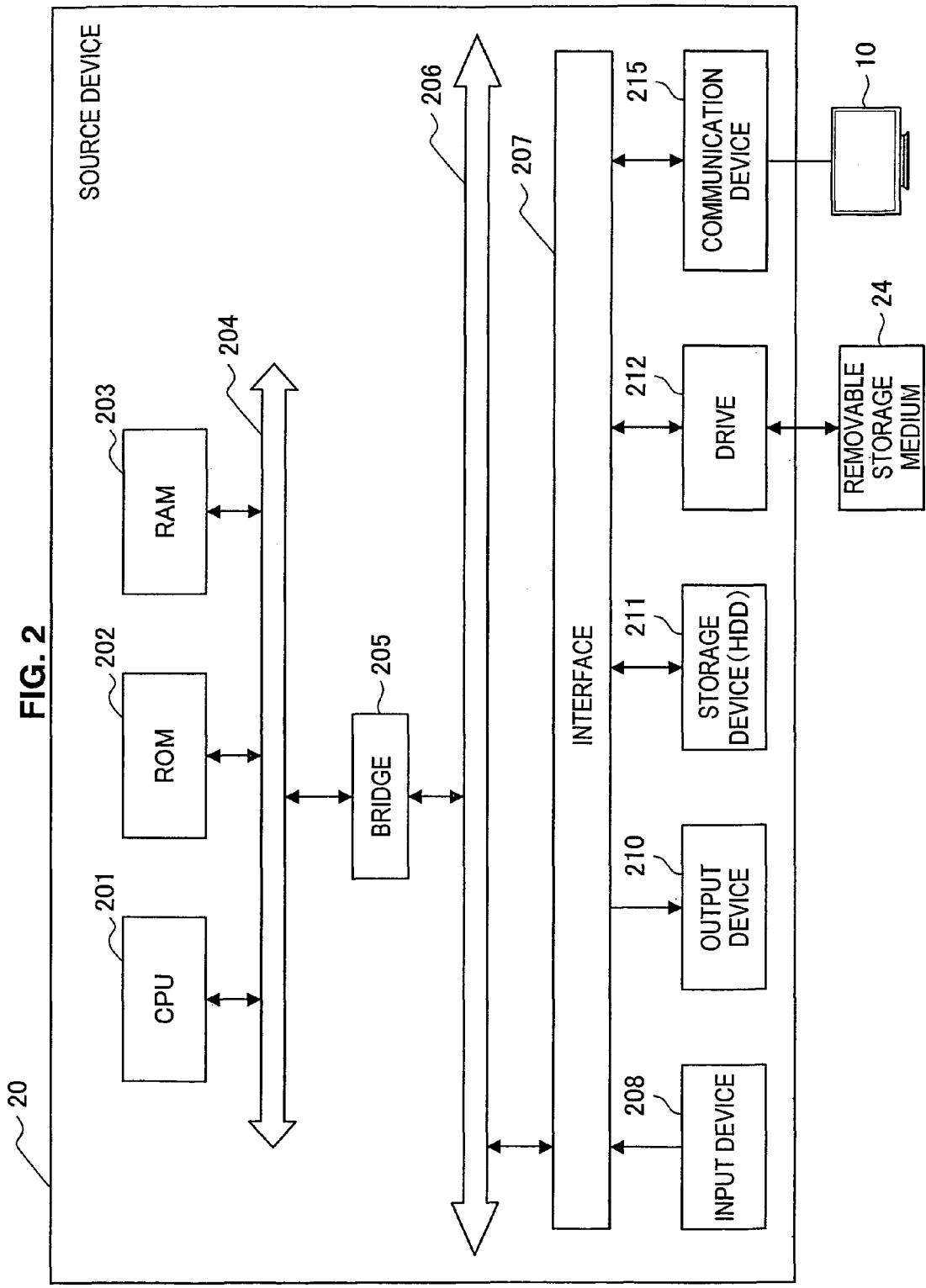
FIG. 2 is a block diagram showing a hardware configuration of a source device.

FIG. 2 is a block diagram showing a hardware configuration of the source device 20. The source device 20 includes a CPU (Central Processing Unit) 201, a ROM (Read Only Memory) 202, a RAM (Random Access Memory) 203, and a host bus 204. The source device 20 includes a bridge 205, an external bus 206, an interface 207, an input device 208, an output device 210, a storage device (HDD) 211, a drive 212, and a communication device 215.

The CPU 201 functions as an arithmetic processing unit and a control device, and controls the entire operation of the source device 20 according to various types of programs. The CPU 201 may be a micro-processor. The ROM 202 stores programs to be used by the CPU 201, operation parameters, and the like. The RAM 203 temporarily stores programs used in the execution of the CPU 201, parameters that appropriately change in the execution, and the like. These are mutually connected by the host bus 204 configured by a CPU bus, and the like.

The host bus 204 is connected to the external bus 206 such as a PCI (Peripheral Component Interconnect/Interface) bus through the bridge 205. The host bus 204, the bridge 205, and the external bus 206 do not necessarily need to be separately configured, and the functions thereof may be mounted on one bus.

The input device 208 is configured by an input means for the user to input information, such as a mouse, a keyboard, a touch panel, a button, a microphone, a switch, or a lever, an input control circuit for generating an input signal based on the input by the user and outputting the same to the CPU 201, and the like. The user of the source device 20 can input various types of data and instruct the processing operation with respect to the source device 20 by operating the input device 208.

The output device 210 includes a display device such as a CRT (Cathode Ray Tube) display device, a liquid crystal display (LCD) device, an OLED (Organic Light Emitting Diode) device, and a lamp. The output device 210 includes an audio output device such as a speaker and a headphone. The output device 210 outputs reproduced contents. Specifically, the display device displays various types of information such as the reproduced video data in text or in images. The audio output device converts the reproduced audio data etc. to audio, and outputs the same.

The storage device 211 is a device for storing data configured as one example of a storage unit of the source device 20 according to the present embodiment. The storage device 211 may include a storage medium, a recording device for recording the data in the storage medium, a read device for reading the data from the storage medium, a deleting device for deleting the data recorded in the storage medium, and the like. The storage device 211 is configured by an HDD (Hard Disk Drive), and the like. The storage device 211 drives the hard disc, and stores the programs to be executed by the CPU 201 and various types of data. The content data are recorded in the storage device 211.

The drive 212 is a storage medium reader/writer and is incorporated in the source device 20 or is externally attached. The drive 212 reads the information recorded in an attached removable storage medium 24 such as a magnetic disc, an optical disc, a magnet-optical disc, or a semiconductor memory, and outputs the information to the RAM 203.

The communication device 215 is a communication interface configured by a communication device etc. for connecting to the display device 10. The communication device 215 transmits and receives content data or various types of requests with the display device 10. The communication device 215 can also communicate with the connected content providing server and the like through the network.

Figure 3:
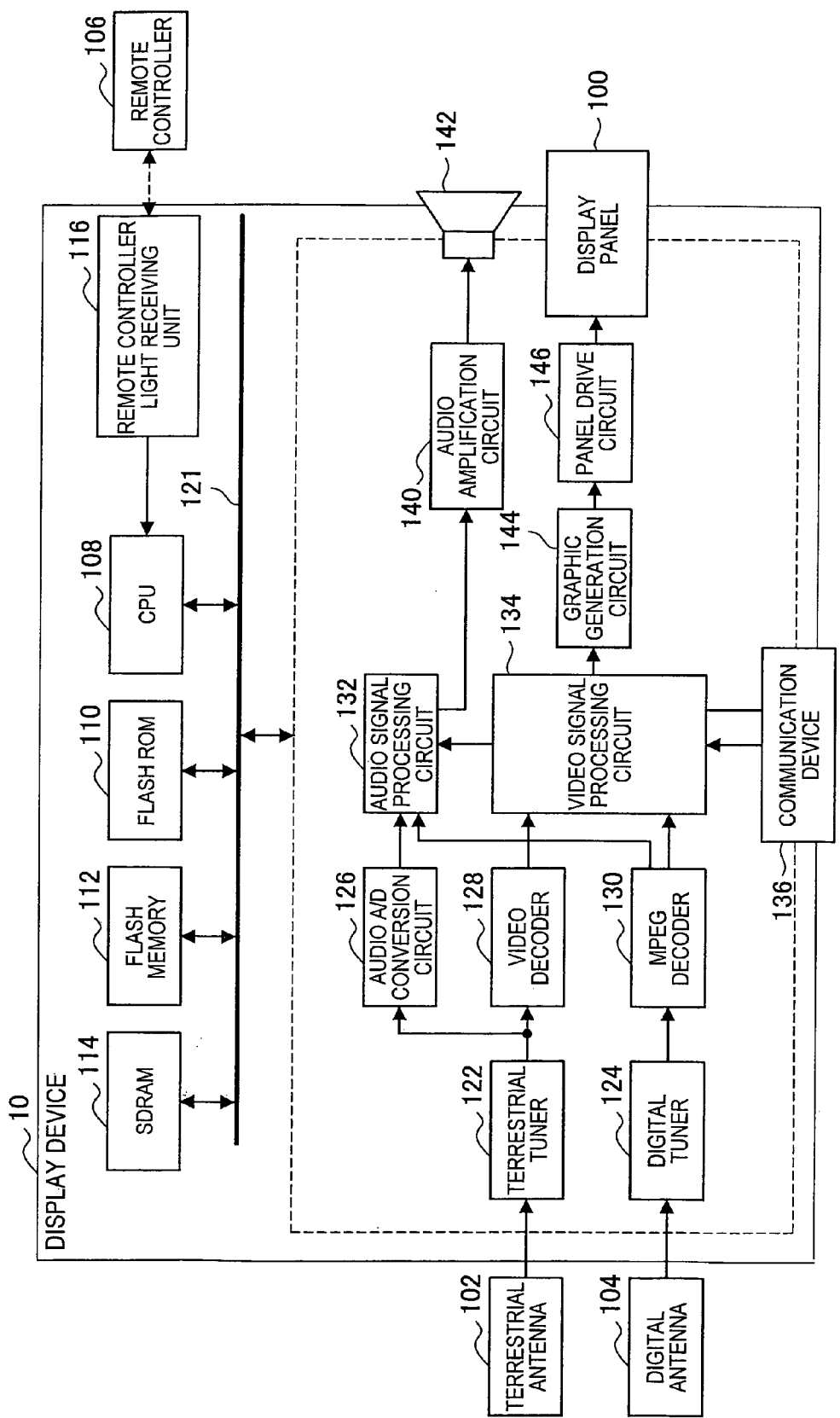
FIG. 3 is a block diagram showing a hardware configuration of a display device according to the present embodiment.

FIG. 3 is a block diagram showing a hardware configuration of the display device 10 according to the present embodiment.

As shown in FIG. 3, the display device 10 includes a display panel 100, a CPU 108, a flash ROM 110, a flash memory 112, and an SDRAM (Synchronous Dynamic Random Access Memory) 114. The display device 10 includes a remote controller light receiving unit 116, a terrestrial tuner 122, and a digital tuner 124. The display device 10 also includes an audio A/D conversion circuit 126, a video decoder 128, an MPEG decoder 130, an audio signal processing circuit 132, and a video signal processing circuit 134. The display device 10 furthermore includes a communication device 136, an audio amplification circuit 140, a speaker 142, a graphic generation circuit 144, and a panel drive circuit 146.

The terrestrial tuner 122 receives a broadcast wave signal transmitted from a terrestrial antenna 102 for receiving analog terrestrial wave, and demodulates the video signal and the audio signal contained in the broadcast wave signal to the baseband signal. The audio signal of the baseband signal demodulated by the terrestrial tuner 122 is transmitted to the audio A/D conversion circuit 126, and the video signal is transmitted to the video decoder 128.

The digital tuner 124 receives the broadcast wave signal transmitted from the digital antenna 104 for receiving the digital broadcasting, and converts the received broadcast wave signal to MPEG2-TS (MPEG2 Transport Stream). The MPEG2-TS is transmitted to the MPEG decoder 130. The digital antenna 104 and the terrestrial antenna 102 correspond to the antenna 22 shown in FIG. 1.

The audio A/D conversion circuit 126 receives an analog audio signal obtained through demodulation by the terrestrial tuner 122, and converts the analog audio signal to a digital audio signal. The digital audio signal is then transmitted to the audio signal processing circuit 132.

The video decoder 128 receives the video signal obtained through demodulation by the terrestrial tuner 122, and converts the analog video signal to a digital component signal. The digital component signal is then transmitted to the video signal processing circuit 134.

The MPEG decoder 130 receives the MPEG2-TS transmitted from the digital tuner 124, and converts the MPEG2-TS to a digital audio signal for the audio and converts the MPEG2-TS to a digital component signal for the video. The digital audio signal is then transmitted to the audio signal processing circuit 132 and the digital component signal is transmitted to the video signal processing circuit 134.

The audio signal processing circuit 132 receives the digital audio signals transmitted from the audio A/D conversion circuit 126 and the MPEG decoder 130, and performs signal processing on the relevant digital audio signals. The signal processed audio signals are transmitted to the audio amplification circuit 140. The audio signal processing circuit 132 also generates an audio signal based on the audio data received from the source device 20 through the communication device 136.

The audio amplification circuit 140 receives the audio signal output from the audio signal processing circuit 132, and amplifies the same by a predetermined amount and then outputs. The amplification amount in the audio amplification circuit 140 corresponds to the volume level instructed by the user of the display device 10. The audio signal amplified by the audio amplification circuit 140 is transmitted to the speaker 142. The speaker 142 outputs audio based on the audio single transmitted from the audio amplification circuit 140.

The video signal processing circuit 134 receives the digital component signals transmitted from the video decoder 128 and the MPEG decoder 130, and performs signal processing on the digital component signals. The signal processed digital component signals are transmitted to the graphic generation circuit 144. The video signal processing circuit 134 also generates a video signal based on the video data received from the source device 20 through the communication device 136.

The communication device 136 is an interface with an external device, and has a wireless communication function with the source device 20, and the like. The communication device 136 may also include an HDMI terminal and an HDMI receiver.

The graphic generation circuit 144 generates a graphic screen (e.g., operation menu screen for extension function) that becomes necessary in the operation of the display device 10. Different graphic screens that become necessary in the operation of the display device 10 are generated depending on the operation of the user. The graphic screen generated by the graphic generation circuit 144 is superimposed with the video signal (i.e., signal processed digital component signal) transmitted from the video signal processing circuit 134 or replaced with the video signal, and then transmitted to the panel drive circuit 146. When the graphic screen is not generated, the video signal transmitted from the video signal processing circuit 134 may be passed to the panel drive circuit 146 as it is.

The panel drive circuit 146 generates a panel drive signal that becomes necessary to display the video on the display panel 100 from the video signal transmitted from the graphic generation circuit 144. The panel drive signal generated by the panel drive circuit 146 is transmitted to the display panel 100, so that the display panel 100 operates according to the panel drive signal thereby displaying the video on the display panel 100.

The display panel 100 displays an image (moving image or still image) based on the panel drive signal transmitted from the panel drive circuit 146. The display panel 100 is configured by an LCD (Liquid Crystal Display), but may be a PDP (Plasma Display Panel), an organic EL (Electro-Luminescence) panel, and the like.

The CPU 108, the flash ROM 110, the flash memory 112, and the SDRAM 114 configure the built-in system described above. Such built-in system controls each unit of the display device 10 and also operates using the downloaded software to execute the various types of extension functions.

The CPU 108 functions as a control unit for controlling each unit of the display device 10. The CPU 108 reads a computer program stored in the flash ROM 110 and sequentially executes the same to control each configuration of the display device 10.

The flash ROM 110 stores the computer program for the CPU 108 to control each unit of the display device 10. The flash memory 112 is a freely readable/writable memory. The SDRAM 114 is a temporary work region of when the CPU 108 executes each computer program.

The remote controller light receiving unit 116 receives the signal transmitted from the remote controller 106. The signal received by the remote controller light receiving unit 116 is input to the CPU 108. The CPU 108 decodes the control code contained in the relevant signal, and controls each unit of the display device 10 so as to perform the operation corresponding to the control code (adjustment of volume level, setting of channel, display of operation menu, etc.).

Each unit of the display device 10 is mutually connected with an internal bus 121, and is configured such that the CPU 108 can control each unit of the display device 10. Furthermore, the display device 10 and the remote controller 106 may wirelessly communicate with each other. An input unit including a button, a dial, and the like for user operation may be arranged at the main body of the display device 10. In FIG. 3, an example in which the display device 10 includes the tuner and the decoder has been shown, but the display device 10 may not include the tuner or the decoder.

<3. Function and Operation of Information Processing System>

The hardware configuration of the display device 10 and the source device 20 has been described with reference to FIGS. 2 and 3. Next, the functions of the display device 10 and the source device 20, as well as the operation of the information processing system 1 will be described with reference to FIGS. 4 to 15.

Figure 4:
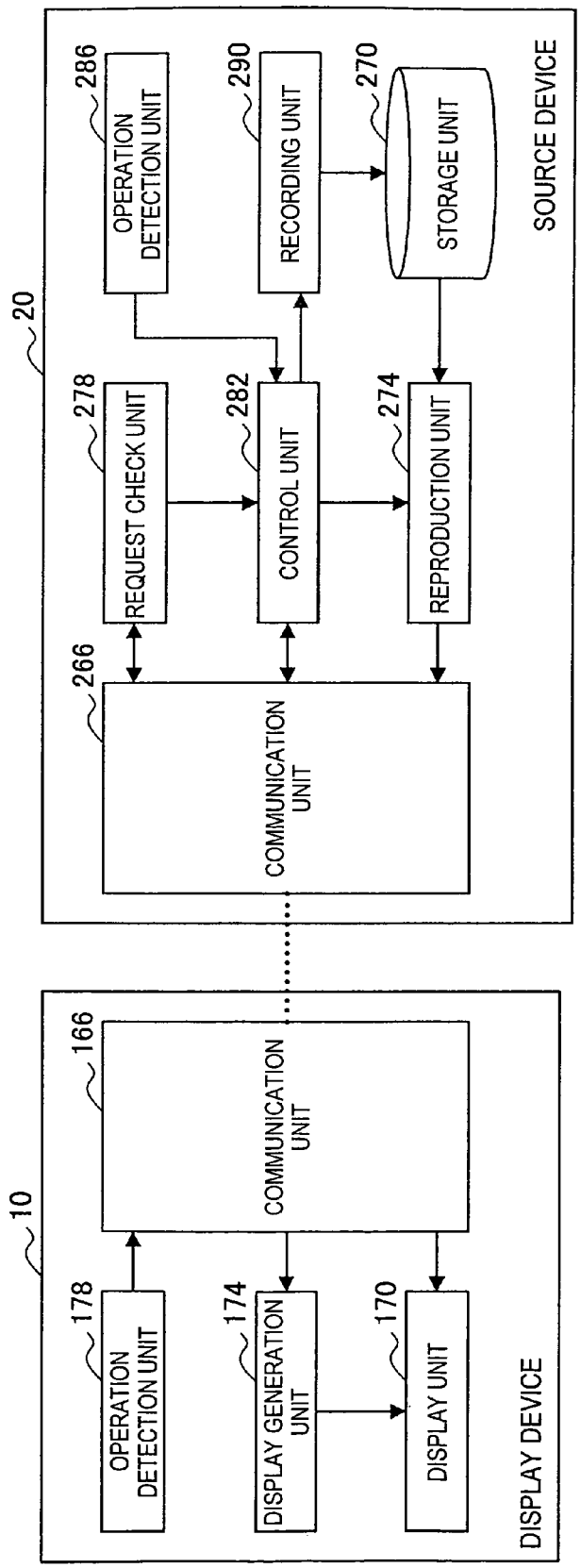
FIG. 4 is a function block diagram showing the configurations of the display device and the source device were shown.

FIG. 4 is a function block diagram showing the configurations of the display device 10 and the source device 20 were shown. As shown in FIG. 4, the display device 10 includes a communication unit 166, a display unit 170, a display generation unit 174, and an operation detection unit 178. The source device 20 includes a communication unit 266, a storage unit 270, a reproduction unit 274, a request check unit 278, a control unit 282, an operation detection unit 286, and a recording unit 290.

The communication unit 266 of the source device 20 is an interface with the display device 10, and performs transmission of content data and status to the display device 10, reception of various requests from the display device 10, and the like. The communication unit 266 also performs authentication of the display device 10 and a connection establishing process such as key exchange with the display device 10. The communication unit 266 is, for example, realized when the CPU 201 controls the communication device 215 shown in FIG. 2.

The content data is recorded in the storage unit 270. For example, the content data acquired through an arbitrary method described in "1. Overall configuration of information processing system according to the present embodiment" is recorded in the storage unit 270 by the recording unit 290. Such storage unit 270 may be a storage medium such as a non-volatile memory, a magnetic disc, an optical disc, or an MO disc.

The reproduction unit 274 reads the content data stored in the storage unit 270 based on the control by the control unit 282. The reproduction unit 274 may decode the content data read from the storage unit 270, as necessary. In this specification, the process including the read of the content data is referred to as reproduction for the sake of convenience of explanation.

The content data reproduced by the reproduction unit 274 is transmitted from the communication unit 266 to the display device 10 connected to the source device 20. If a plurality of display devices 10 is connected to the source device 20, the content data reproduced by the reproduction unit 274 is transmitted by multicast.

When an arbitrary request is received by the communication unit 266 from the connected display device 10, the request check unit 278 determines whether or not to permit the request. The arbitrary request may be a request related to the reproduction process such as content fast forward, rewind, pause, chapter switching, and changing of reproduction contents, an exclusive request to be described later, and the like. The details will be described later, but when the request is received by the communication unit 266, the request check unit 278 checks the need to execute the request with the user of the display device 10 other than the requesting source device, and determines whether or not to permit the request according to the check result.

The control unit 282 controls the entire operation of the source device 20. For example, the response control for the request permitted by the request check unit 278 is carried out. More specifically, when the request related to the reproduction process is permitted by the request check unit 278, the reproduction control according to the request is executed by the reproduction unit 274. The control unit 282 performs the response control for the request indicated by the user operation detected by the operation detection unit 286.

When the connections between all the display devices 10 and the communication unit 266 are disconnected, the control unit 282 stops the reproduction of contents by the reproduction unit 274. According to such configuration, the display device 10 of the user starting to newly view the content can freely access the source device 20. Furthermore, the power consumption can be reduced.

The operation detection unit 286 detects the user operation with respect to the source device 20. If the source device 20 is operated by a remote controller, the operation detection unit 286 may be a light receiving unit for infrared light emitted from the remote controller or a wireless receiving unit. The user operation on the source device 20 includes content reproduction request, fast forward, rewind, pause, chapter switching, changing of reproduction content, recording start and recording stop, etc.

When instructed to record the content data by the control unit 282, the recording unit 290 records the content data acquired through an arbitrary method in the storage unit 270. For example, the recording unit 290 may record the program content data acquired from the broadcast station 12, the content data acquired from the content providing server through the network, and the content data acquired from the attached optical disc in the storage unit 270.

The communication unit 166 of the display device 10 is an interface with the source device 20, and performs reception of content data and status from the source device 20, transmission of various types of requests to the source device 20, and the like. The communication unit 166 also performs authentication with the source device 20, and a connection establishing process such as key exchange with the source device 20. If the content data received from the source device 20 is encrypted, the communication unit 166 decrypts the content data using the key acquired by the key exchange. The communication unit 166 is realized when the CPU 108 controls the communication device 136 shown in FIG. 3.

The display unit 170 displays the content data received from the source device 20 by the communication unit 166 and the display screen generated by the display generation unit 174. The display unit 170 corresponds to the panel drive unit 146 and the display panel 100 shown in FIG. 3. If the content data received from the source device 20 is encoded, the display unit 170 also decodes the content data.

The display generation unit 174 generates various types of check screens based on instructions transmitted from the source device 20. The detailed description and the specific example of the check screen will be described with reference to FIGS. 7 to 15. The display generation unit 174 corresponds to the graphic generation circuit 144 shown in FIG. 3.

The operation detection unit 178 detects the user operation with respect to the display device 10. The operation detection unit 178 corresponds to the remote controller light receiving unit 116 shown in FIG. 3, and detects the user operation in the remote controller 106. The user operation includes permitting/rejecting operation in the check screen, operation indicating the request related to the reproduction process of the content, and the like.

A specific operation of the information processing system 1 according to the present embodiment including the display device 10 and the source device 20 will be hereinafter described in the order of at the start of viewing of contents, at the time of reproduction control, and at the time of transition to the exclusive state and at the time of release of the exclusive state.

(At Start of Viewing of Contents)

The display device 10 acquires the status of each source device 20, and performs a connection with the source device 20 selected by the user. The operation at the start of viewing of contents in the display device 10C will be hereinafter specifically described with reference to FIGS. 5 and 6.

Figure 5:
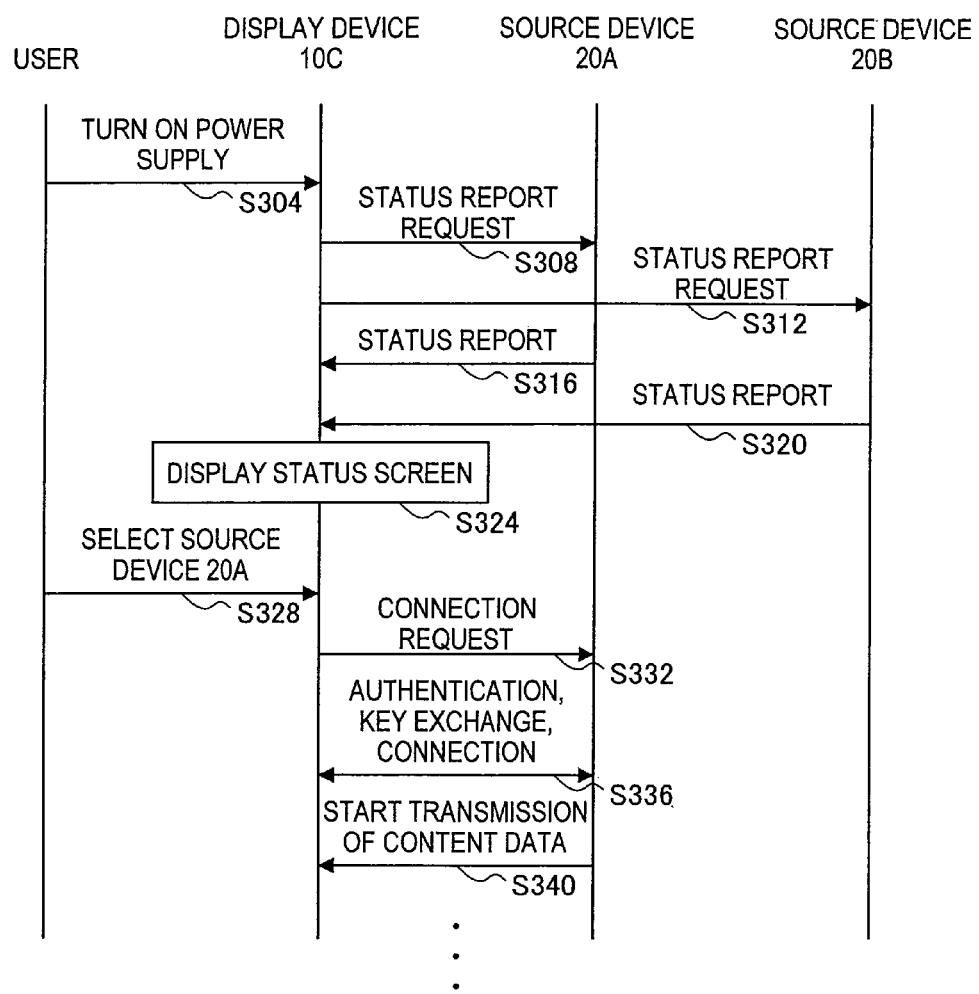
FIG. 5 is a sequence chart showing the flow of operation at the start of viewing of content in the information processing system according to the present embodiment.

FIG. 5 is a sequence chart showing the flow of operation at the start of viewing of content in the information processing system 1 according to the present embodiment. As shown in FIG. 5, when the power supply of the display device 10C is first turned ON by the user (S304), the communication unit 166 of the display device 10C transmits a status report request to the source device 20A and the source device 20B (S308, S312).

The status includes reproducing, stop, power OFF, title of content being reproduced, title of content being stored, presence of exclusive state, and the like. The source device 20A and the source device 20B report the status to the display device 10C in response to the request from the display device 10C (S316, S320).

In FIG. 5, an example of acquiring the status of the source device 20 when requested by the display device 10C is shown, but the present invention is not limited to such example. For example, the source device 20 may periodically transmit the status, or may transmit at the time of change (e.g., at the time of change of the reproduction content).

When receiving the status reports from the source device 20A and the source device 20B, the display generation unit 174 of the display device 10C generates a status screen showing the statuses of the source device 20A and the source device 20B, and causes the display unit 170 to display the status screen.

Figure 6:
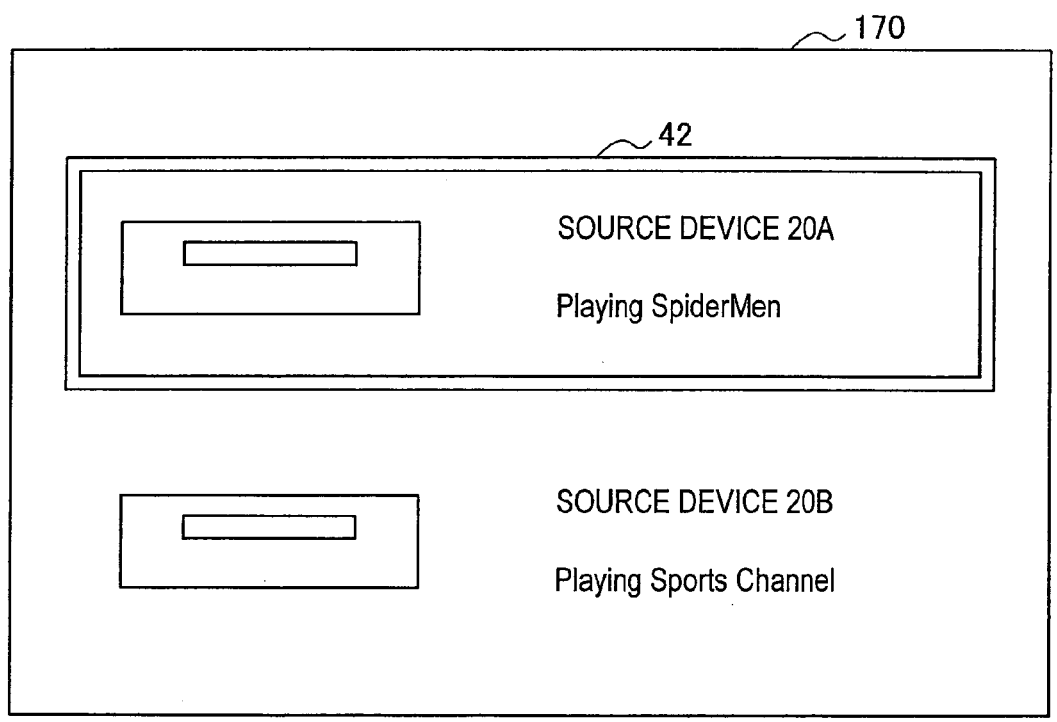
FIG. 6 is an explanatory diagram showing a specific example of a status screen of the source device.

FIG. 6 is an explanatory diagram showing a specific example of the status screen of the source device 20. As shown in FIG. 6, the status screen includes the name of the source device and the title of the content being reproduced. The user can operate the remote controller 106 to move the cursor 42 and select the source device 20 in the status screen. If the reproduction of the content is not performed in the source device 20, the display device 10 displays "No Playing" etc. to notify that the user can execute the reproduction of the source device 20.

When the user selects the source device 20A in the status screen, the display device 10C transmits a connection request to the source device 20A (S332). Subsequently, the communication unit 166 of the display device 10 and the communication unit 266 of the source device 20 carry out the authentication process and the key exchange to be mutually connected (S340). The source device 20A then starts the transmission of the content data being reproduced to the display device 10C by multicast (S340).

Thus, according to the present embodiment, the enhancement in the user convenience is expected since the user can select the source device 20 to connect after grasping the content being reproduced in each source device 20 at the start of viewing of the contents.

(At the Time of Reproduction Control)

If the same source device 20 and a plurality of display devices 10 are connected, the change of the reproduction control in the source device 20 influences the display content in the plurality of display devices 10. Therefore, the reproduction control desired with respect to the source device 20 by the user of a certain display device 10 may not meet the intention of other users. Therefore, if a request regarding the reproduction control is made from one display device 10, the source device 20 executes after checking the need of the relevant request with other display devices 10. The operation of the source device 20A connected with the display devices 10A to 10C will be specifically described below with reference to FIGS. 7 to 9.

Figure 7:
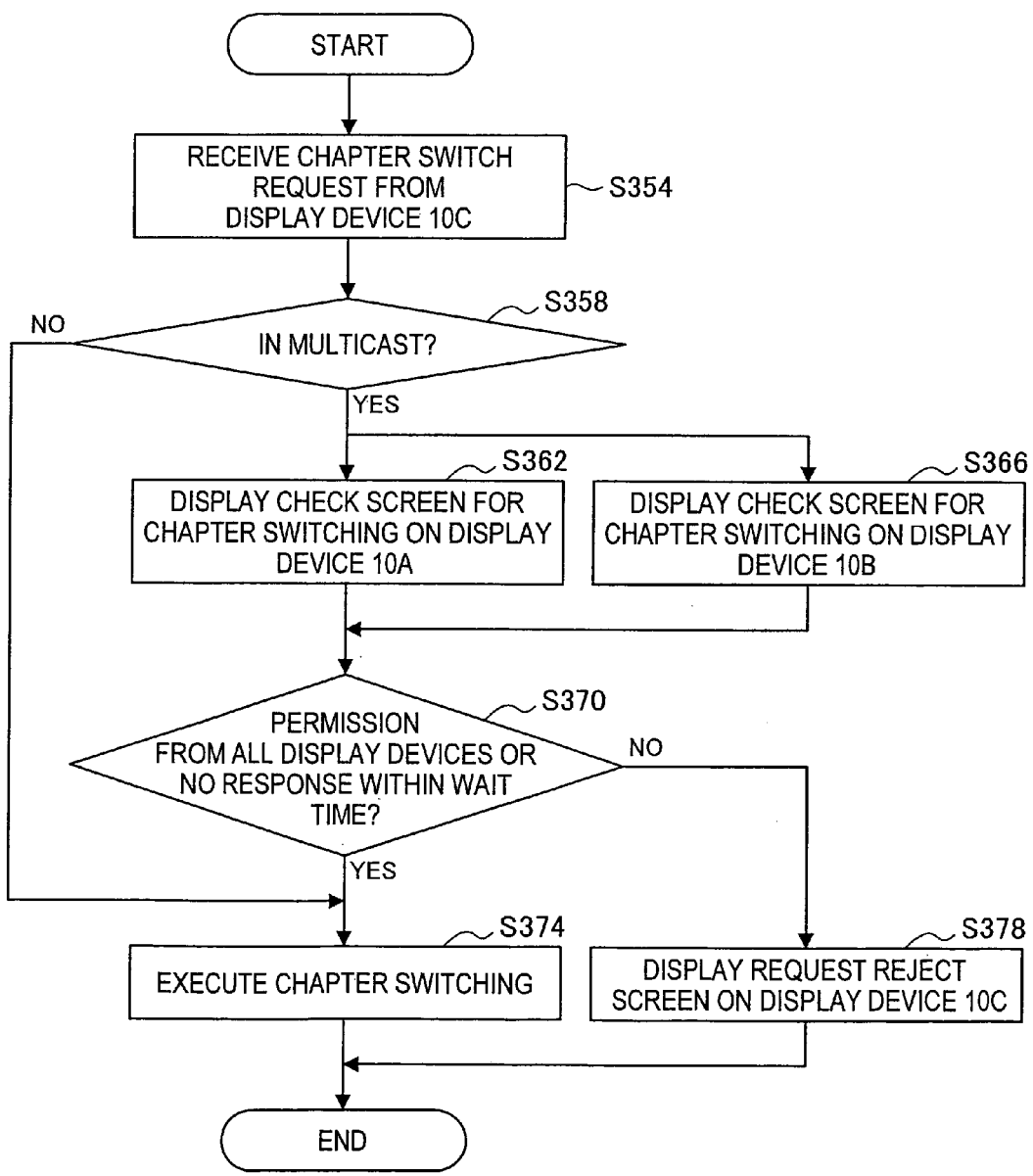
FIG. 7 is a flowchart showing the flow of operation of the source device connected with a plurality of display devices.

FIG. 7 is a flowchart showing the flow of operation of the source device 20A connected with the plurality of display devices 10A to 10C. As shown in FIG. 7, when the source device 20A receives a chapter switch request from the display device 10C (S354), whether or not currently in the multicast of the content data is determined by the request check unit 278 (S358). Since the source device 20A is connected with a plurality of display devices 10A to 10C, determination is made as currently in the multicast of the content data.

Figure 8:
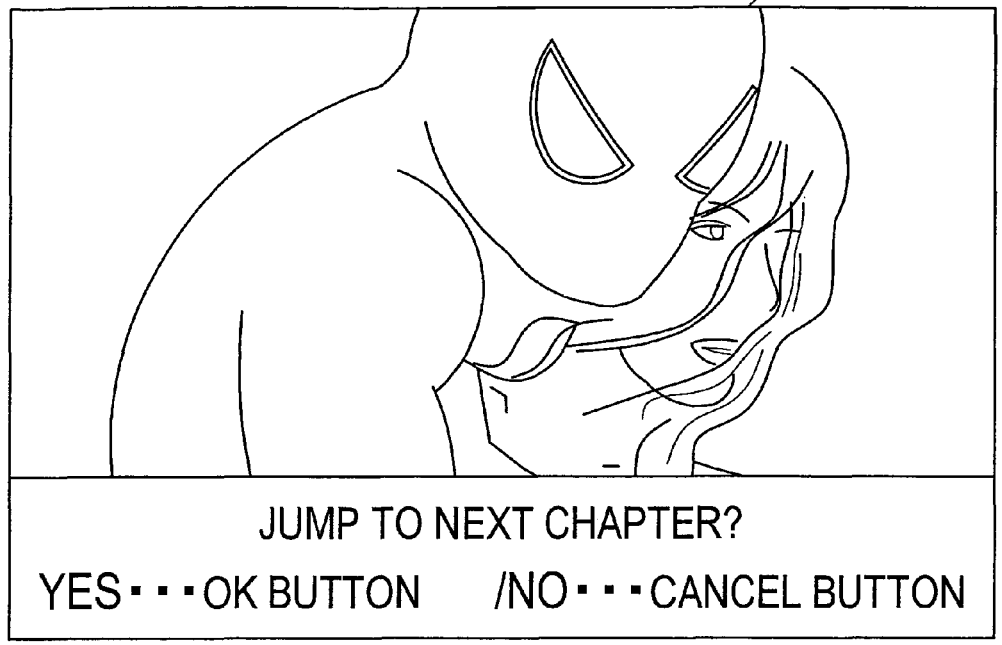
FIG. 8 is an explanatory diagram showing a specific example of a check screen for chapter switching.

In this case, the request check unit 278 causes the display devices 10A and 10B other than the display device 10C, which is the requesting source, to display, for example, a check screen for chapter switching shown in FIG. 8 (S362, S366).

FIG. 8 is an explanatory diagram showing a specific example of a check screen for chapter switching. As shown in FIG. 8, the check screen for chapter switching shows an operation (OK button) for permitting and an operation (Cancel button) for rejecting the switching of the chapters. The check screen is generated by the display generation unit 174 based on the information received from the source device 20 and displayed on the display unit 170. When the operations by the users of the display devices 10A and 10B are detected by the operation detection unit 178 in the relevant check screen, the display devices 10A and 10B transmit to the source device 20 whether or not the request is permitted by the user.

When the request is permitted by both the display devices 10A and 10B, or when a response is not made within a predetermined wait time, the request check unit 278 permits the chapter switch request from the display device 10C (S370). The control unit 282 controls the reproduction unit 274 and causes the reproduction unit 274 to execute chapter switching (S374).

Figure 9:
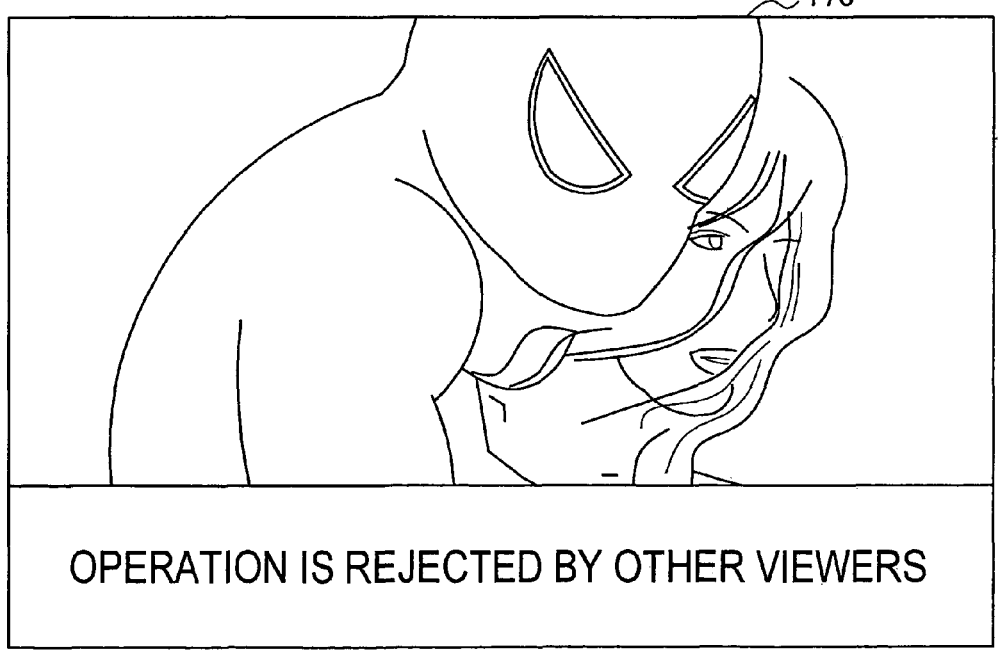
FIG. 9 is an explanatory diagram showing a specific example of a request reject screen.

When the request is rejected by at least one of the display devices 10A and 10B, the request check unit 278 does not permit the chapter switch request from the display device 10C and causes the display device 10C to display a request reject screen shown in FIG. 9 (S378). If the source device 20 is not in multicast, the request check unit 278 permits the request from the display device 10C (S358).

Therefore, the source device 20 according to the present embodiment performs the response control for the request after checking with other displays devices 10 being connected when an arbitrary request is made from one display device 10. Therefore, the source device 20 according to the present embodiment can perform the control that meets the intention of the users of the display devices 10 being connected. In other words, even if a plurality of users is viewing the plurality of display devices 10 arranged in different rooms as shown in FIG. 1, the process equivalent to the exchange between users that is carried out when a plurality of users is viewing the same display device 10 together can be realized.

(At Time of Transition to Exclusive State and at Time of Release of Exclusive State)

As described above, when an arbitrary request is made from one display device 10, the source device 20 according to the present embodiment performs a response control for the request after checking with other display devices 10 in connection. However, a case where a certain user desires to perform a free operation without obtaining the confirmation of other users is also assumed. Thus, the source device 20 according to the present embodiment can enable the display device 10 to have exclusive use of the source device 20 according to the request from the display device 10. The flow at the time of transition to the exclusive state of the display device 10 will be described with reference to FIGS. 10 to 12, and the flow at the time of release of the exclusive state will be described with reference to FIGS. 13 to 15.

Figure 10:
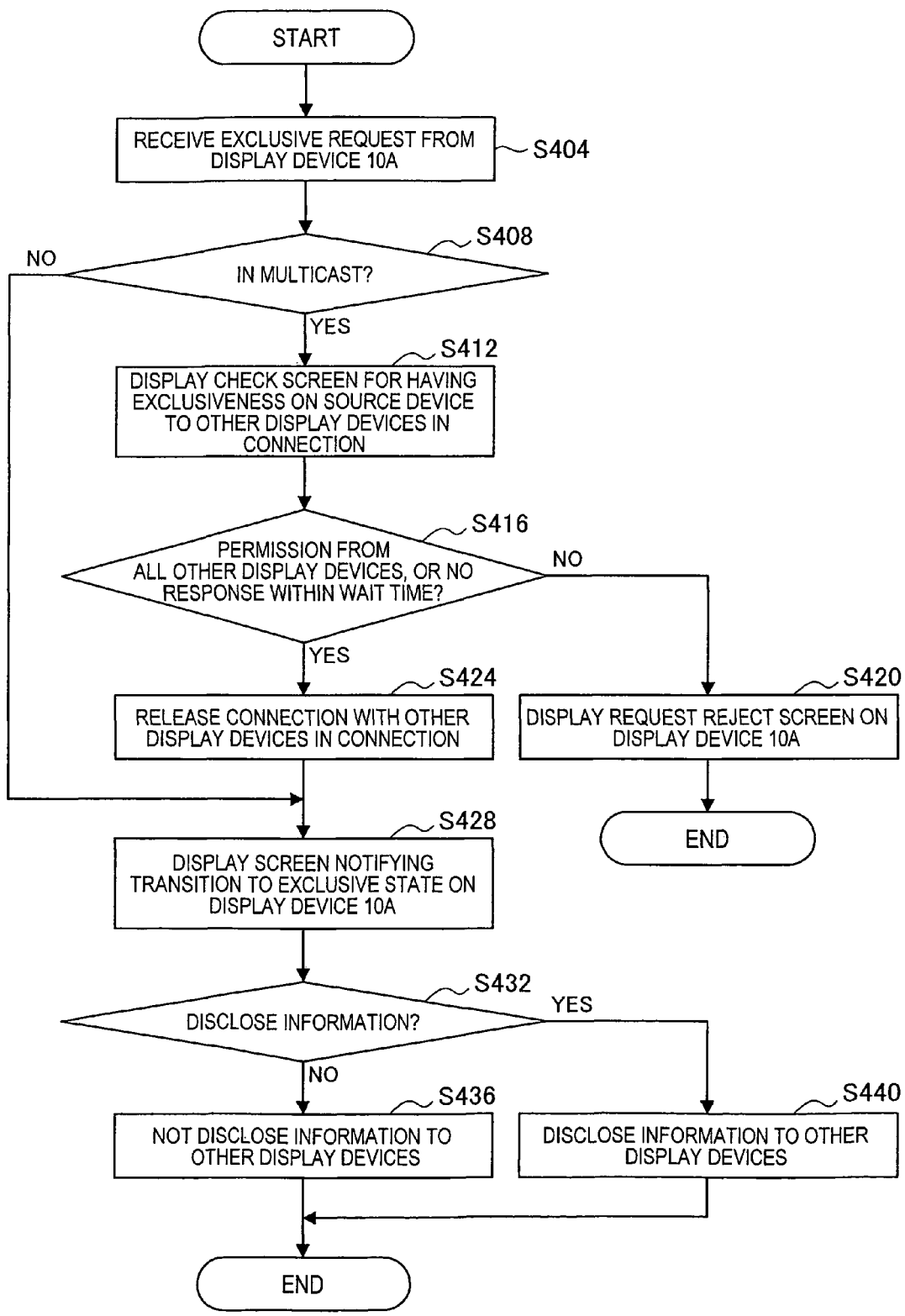
FIG. 10 is a flowchart showing the flow in which the source device makes the display device transition to an exclusive state.

FIG. 10 is a flowchart showing the flow in which the source device 20A makes the display device 10A transition to an exclusive state. As shown in FIG. 10, when the source device 20A first receives an exclusive request from the display device 10A (S404), the request check unit 278 checks whether or not the content data is currently in multicast (S408). When the content data is currently in multicast, the request check unit 278 causes the other display devices 10 in connection to display a check screen for exclusive use on the source device 20A (S412). The request check unit 278 advances to the process of S428 when the content data is not currently in multicast.

Figure 11:
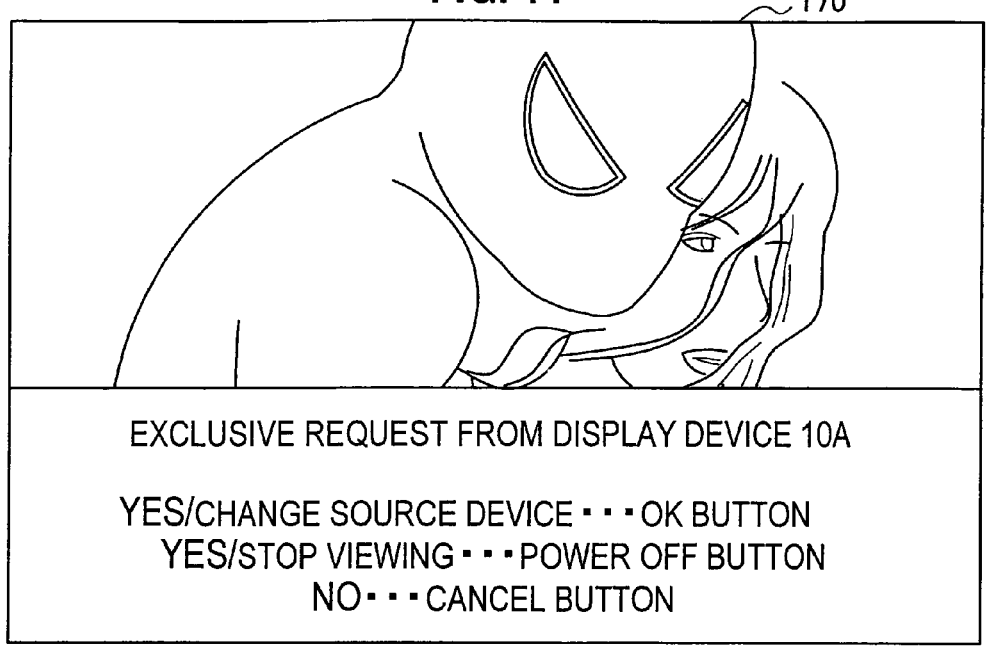
FIG. 11 is an explanatory diagram showing a specific example of a check screen for exclusive request was described.

FIG. 11 is an explanatory diagram showing a specific example of a check screen for exclusive request. As shown in FIG. 11, the check screen for exclusive request shows the operation (OK button) for permitting the request and changing the source device 20, the operation (power OFF button) for permitting the request and stopping the viewing of the content, and the operation (Cancel button) for rejecting the request. In the check screen, when one of the operations is carried out by the user of the display device 10, the display device 10 transmits the operation content by the user to the source device 20.

If the request is permitted in all other display devices 10 in connection, or if a response is not made within a predetermined wait time, the request check unit 278 permits the exclusive request from the display device 10A (S416). Furthermore, the control unit 282 controls the communication unit 266, and cuts off the connection between all the other display devices 10 in connection and the communication unit 266 (S424). If the request is rejected in one of the display devices 10 in connection, the request check unit 278 does not permit the exclusive request from the display device 10C, and causes the display device 10A to display a request reject screen shown in FIG. 9 (S420).

Figure 12:
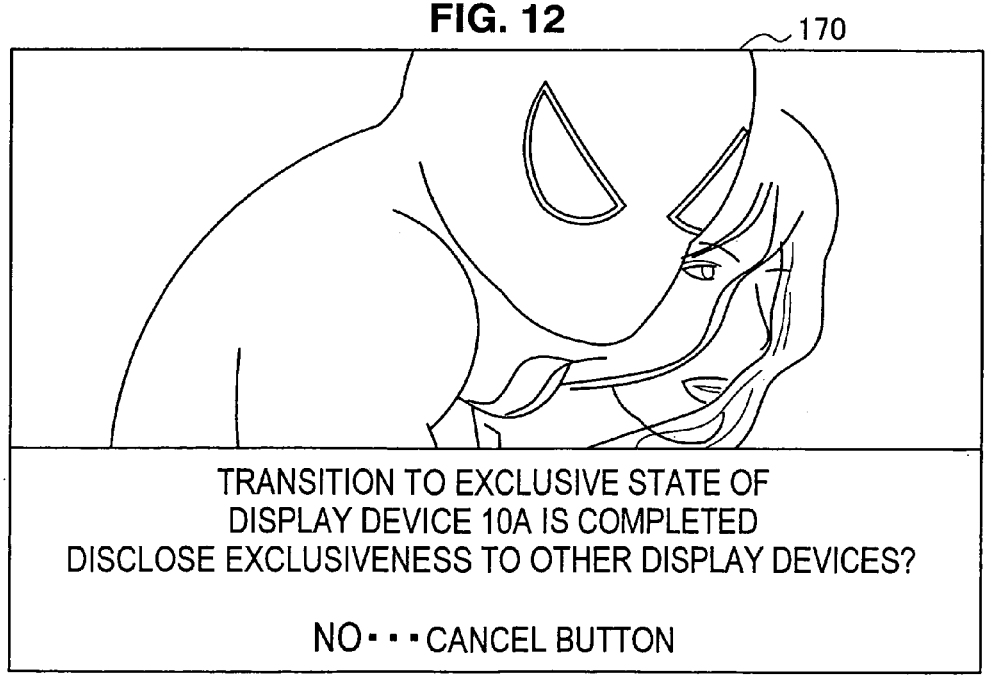
FIG. 12 is an explanatory diagram showing a specific example of a screen notifying transition to the exclusive state.

When the connection between all the other display devices 10 in connection and the communication unit 266 is cut off, the control unit 282 causes the display device 10A, which is the requesting source, to display a screen notifying transition to the exclusive state shown in FIG. 12, for example (S428).

FIG. 12 is an explanatory diagram showing a specific example of a screen notifying transition to the exclusive state. As shown in FIG. 12, the screen notifying transition to the exclusive state notifies that the transition to the exclusive state is completed, and shows the operation (Cancel button) for having exclusiveness non-disclosed to other display devices 10. The information is not disclosed to other display devices 10 (S436) if the Cancel button is selected by the user of the display device 10A in the screen notifying transition to the exclusive state (S432), and disclosed (S440) if the Cancel button is not selected.

Therefore, the display device 10 can freely control the source device 20 without obtaining the confirmation of other users by transitioning to the exclusive state. The display device 10 can also make the content data being reproduced in the source device 20 not disclosed to other than the own device by transitioning to the exclusive state. Furthermore, since the source device 20 can transmit the content data in the most suitable format to one display device 10, the lowering of the quality by format conversion of the content data can be prevented.

Figure 13:
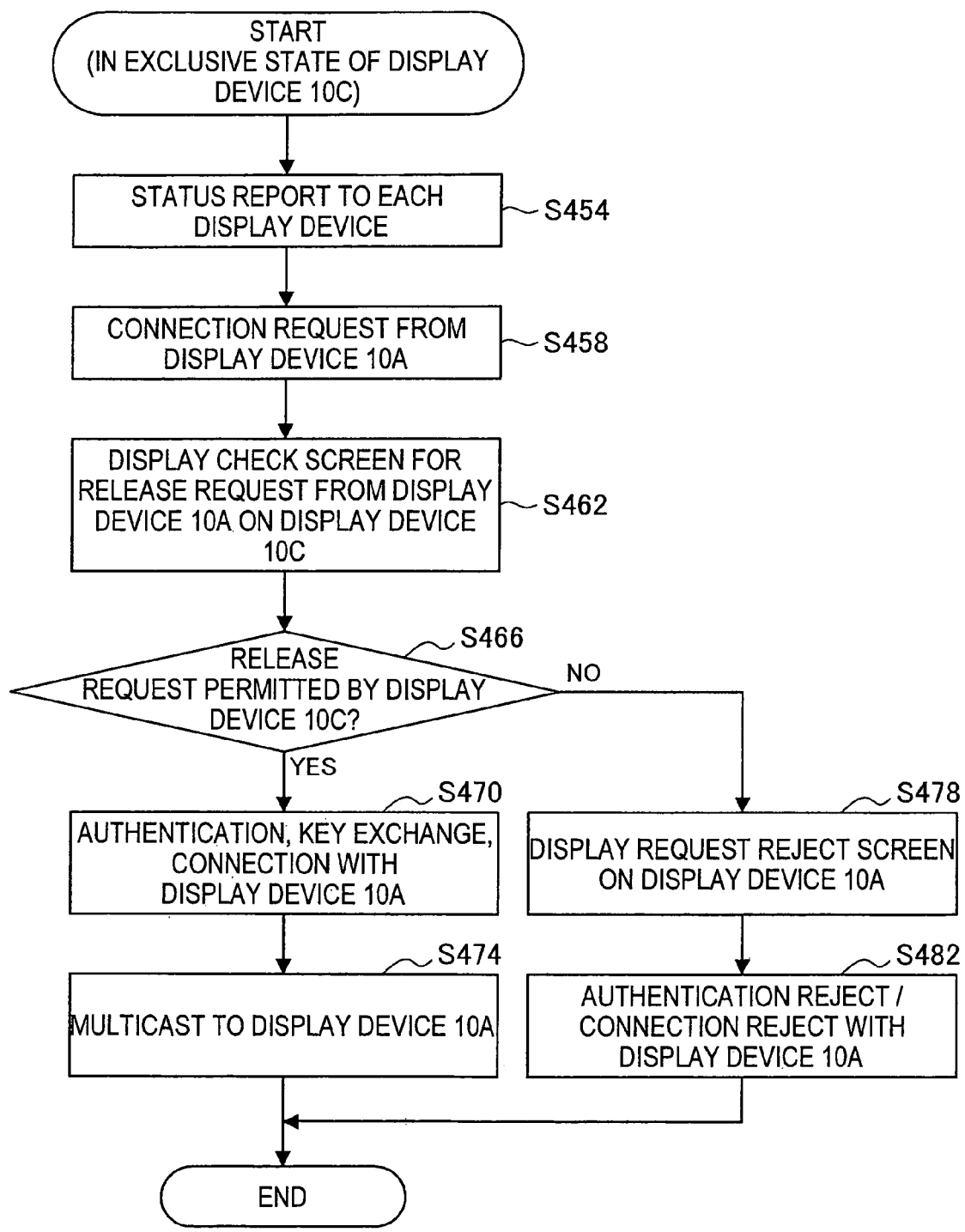
FIG. 13 is a flowchart showing the flow in which the source device releases the exclusive state of the display device.

FIG. 13 is a flowchart showing the flow in which the source device 20A releases the exclusive state of the display device 10C. First, as shown in FIG. 13, the source device 20A in the exclusive state of the display device 10C performs a status report to each display device 10 (S454), and receives a connection request from the display device 10A (S458). In this case, the request check unit 278 of the source device 20A causes the display device 10C in the exclusive state to display a check screen for release request shown in FIG. 14 (S462).

Figure 14:
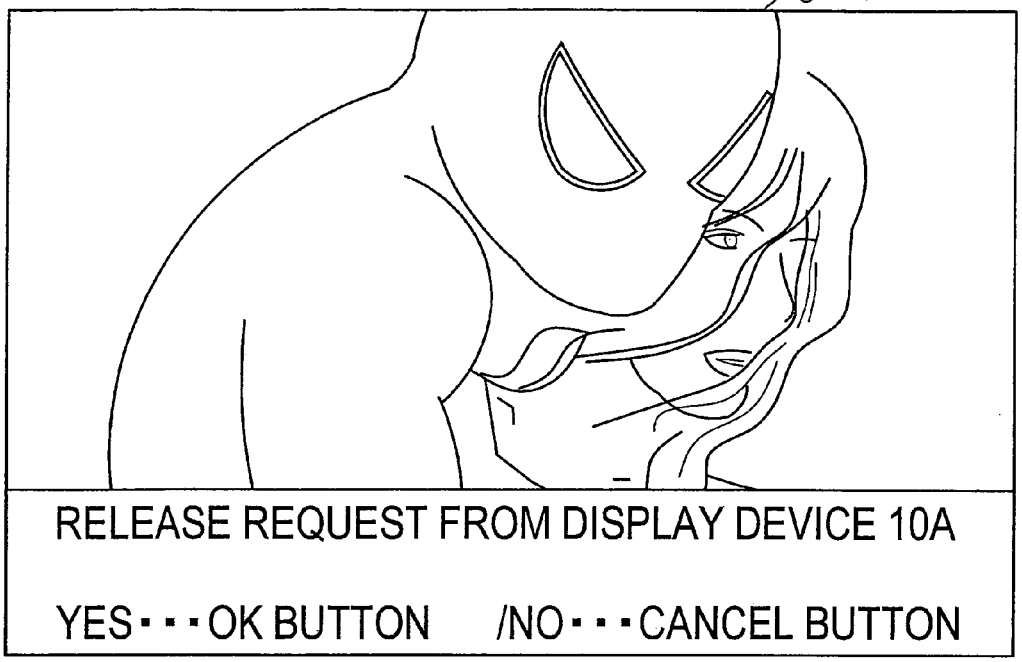
FIG. 14 is an explanatory diagram showing a specific example of a check screen for release request.

FIG. 14 is an explanatory diagram showing a specific example of a check screen for release request. As shown in FIG. 14, the check screen for release request shows the operation (OK button) for permitting the release of the exclusive state, and the operation (Cancel button) for rejecting the release of the exclusive state. When the user operation is detected by the operation detection unit 178 of the display device 10C in the check screen for release request, the content indicated by the user operation is transmitted to the source device 20A.

If the release request is permitted by the display device 10C, or if a response is not made within a predetermined wait time (S466), the request check unit 278 of the source device 20A permits the connection request from the display device 10A. The control unit 282 then causes the communication unit 266 to perform authentication, key exchange, and connection with the display device 10A (S470). Therefore, the communication unit 266 also multicasts the content data reproduced by the reproduction unit 274 to the display device 10A (S474).

Figure 15:
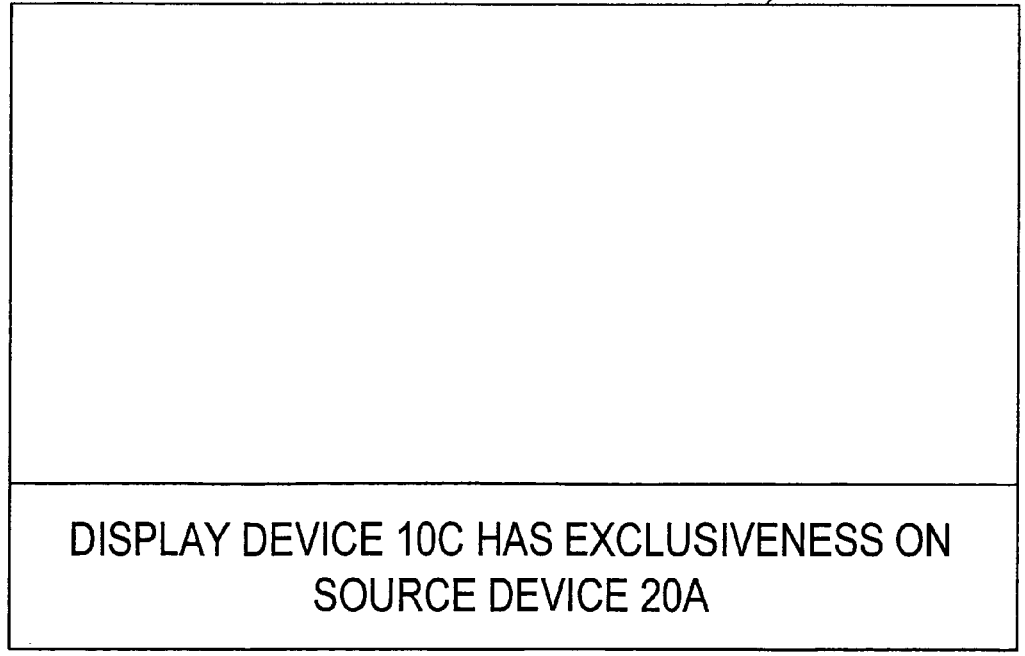
FIG. 15 is an explanatory diagram showing a specific example of a request reject screen.

If the release request is rejected by the display device 10C (S466), the request check unit 278 of the source device 20A rejects the connection request from the display device 10A, and causes the display device 10A to display a request reject screen shown in FIG. 15 (S478). The communication unit 266 rejects the authentication with the display device 10A, and rejects the connection S(S482).

In the above description, an example in which the exclusive state is released according to the request from other display devices 10 has been described, but the present invention is not limited thereto. For example, the source device 20 may release the exclusive state (delete the parameter indicating the exclusive state contained in the status) according to the voluntary operation of the user of the display device 10 in the exclusive state. The source device 20 may release the exclusive state when the connection with the display device 10 in the exclusive state is released by the power OFF of the display device 10, and the like. Furthermore, the source device 20 may release the exclusive state when the user operation (e.g., recording start operation) is detected by the operation detection unit 286 of the own device.

<4. Conclusion and Supplement>

As described above, according to the present embodiment, the enhancement in the user convenience is expected since the user can select the source device 20 to connect after grasping the content being reproduced in each source device 20 at the start of viewing of the contents. When an arbitrary request is made from one display device 10, the source device 20 according to the present embodiment performs a response control for the request after obtaining the confirmation of other display devices 10 in connection. Therefore, the source device 20 according to the present embodiment can perform the control that meets intention of the user of the display device 10 in connection.

Furthermore, the display device 10 according to the present embodiment can freely control the source device 20 without obtaining the confirmation of other users by transitioning to the exclusive state. The display device 10 can make the content data being reproduced in the source device 20 non-disclosed other than to the own device by transitioning to the exclusive state. Furthermore, since the source device 20 can transmit the content data in the most suitable format to one display device 10, the lowering of the quality by format conversion of the content data can be prevented.

The preferred embodiments of the present invention have been described above with reference to the accompanying drawings, whilst the present invention is not limited to the above examples, of course. A person skilled in the art may find various alternations and modifications within the scope of the appended claims, and it should be understood that they will naturally come under the technical scope of the present invention.

For example, an example in which the request check unit 278 of the source device 20 determines whether or not to permit the request indicated by the user operation when the user operation is detected by the operation detection unit 178 of the display device 10 has been described above. On the contrary, the priority of direct operation with respect to the source device 20 detected by the operation detection unit 286 of the source device 20 may be set high, and the control unit 282 may execute the response control for the request indicated by the direct operation without the determination by the request check unit 278.

Furthermore, an example in which the request check unit 278 of the source device 20 determines whether or not to permit the request according to the arbitrary request from the display device 10 has been described above, but the present invention is not limited thereto. For example, if the determination by the request check unit 278 is necessary for the recording request of the program content data with respect to the source device 20, a case where the program content data may not be recorded may occur. Therefore, the priority of a specific request such as the recording request of the program content data may be set high, and the control unit 282 may execute the response control for the specific request without the determination by the request check unit 278.

The above description has been made focusing on the case where the information processing device is the source device 20, but the present invention is not limited thereto. For example, the information processing device may be a tuner, in which case the tuner may select the station after confirming the need for the station select request from the display device 10 with other display devices 10. Furthermore, the information processing device may be an input selector, connected with a plurality of reproduction devices, for selectively transmitting the content data input from one of the reproduction devices. In this case, the input selector may switch the reproduction device, or the source of input of the content data, after confirming the need for a selector switch request from the display device 10 with other display devices 10.

Each step in the process of the information processing system 1 or the source device 20 of the present specification may not be processed in time-series in the order described in the sequence chart or the flowchart. For example, each step in the process of the information processing system 1 or the source device 20 may also include processes executed in parallel or individually (e.g., parallel process or process by object).

The computer program for causing the hardware such as the CPU 108, the flash ROM 110, and the SDRAM 114 incorporated in the display device 10 to exhibit the functions same as each configuration of the display device 10 described above may be created. Similarly, the computer program for causing the hardware such as the CPU 201, the ROM 202, and the RAM 203 incorporated in the source device 20 to exhibit the functions same as each configuration of the source device 20 described above may be created.

A storage medium having the computer program stored therein is also provided. A series of processes can be realized with the hardware by configuring each function block shown in the function block diagram of FIG. 4 with hardware.

The invention claimed is:

1. An information processing device comprising:
    a communication unit operable to:
        transmit content data to a plurality of display devices; and
        transmit status of the content data being reproduced to one of the plurality of display devices;
    a request check unit operable to:
        cause other of the plurality of display devices to display a check screen upon reception of a request from the one of the plurality of display devices,
        wherein the request comprises an exclusive use request for a predetermined source device from a plurality of source devices,
        wherein the request is based on the status of the content data being reproduced in each of the plurality of source devices, the information processing device being included in the plurality of source devices; and
        determine whether to permit the request to use the predetermined source device exclusively, in accordance with a user operation in each of the other of the plurality of display devices which display the check screen, or reject the request when a user operation rejects the request in one of the other of the plurality of display devices; and
    one or more processors and a storage medium configured to store one or more instructions to be executed by the one or more processors, the one or more processors configured to release a connection between the communication unit and the other of the plurality of display devices, when the request is transmitted from the one of the plurality of display devices and the request is permitted by the request check unit, to enable the one of the plurality of the display devices to use the predetermined source device exclusively based on permission or rejection of the request.

2. The information processing device according to claim 1, further comprising:
    a reproduction unit operable to reproduce the content data transmitted from the communication unit, wherein the one or more processors are configured to control the reproduction of the content data by the reproduction unit according to the request when the request check unit permits the request.

3. The information processing device according to claim 2, wherein the reproduction unit stops the reproduction of the content data when the connection between all of the plurality of display devices and the communication unit is released.

4. The information processing device of claim 1, wherein the status of the content data comprises one or more of reproduction of the content data, title of the content data, presence of exclusive state, or power off state.

5. The information processing device of claim 1, wherein the status is transmitted from the communication unit based on a status request from the one of the plurality of display devices.

6. The information processing device of claim 1, wherein one of the other of the plurality of source devices is selected for viewing the content data based on the status of the content data being reproduced in the information processing device and the other of the plurality of source devices.

7. The information processing device of claim 1, wherein the request from one of the plurality of display devices is permitted if there is no response from the other of the plurality of display devices within a predetermined time.

8. The information processing device of claim 1, wherein the other of the plurality of source devices transmit content data and the status of the content data being reproduced to the plurality of display devices.

9. An information processing system comprising:
- an information processing device comprising:
  - a communication unit operable to:
    - transmit content data to a plurality of display devices; and
    - transmit status of the content data being reproduced to one of the plurality of display devices;
  - a request check unit operable to:
    - cause other of the plurality of display devices to display a check screen upon reception of a request from the one of the plurality of display devices,
    - wherein the request comprises an exclusive use request for a predetermined source device from a plurality of source devices,
    - wherein the request is based on the status of the content data being reproduced in each of the plurality of source devices, the information processing device being included in the plurality of source devices; and
    - determine whether to permit the request to use the predetermined source device exclusively, in accordance with a user operation in each of the other of the plurality of display devices which display the check screen, or reject the request when a user operation rejects the request in one of the other of the plurality of display devices; and
- one or more processors and a storage medium configured to store one or more instructions to be executed by the one or more processors, the one or more processors configured to release connection between the communication unit and the other of the plurality of display devices, when the request is transmitted from the one of the plurality of display devices and the request is permitted by the request check unit, to enable the one of the plurality of the display devices to use the predetermined source device exclusively based on permission or rejection of the request.

* * * * *